June 18, 1968   W. J. SMOTHERS   3,389,214
COATED INSULATOR
Filed Aug. 20, 1963
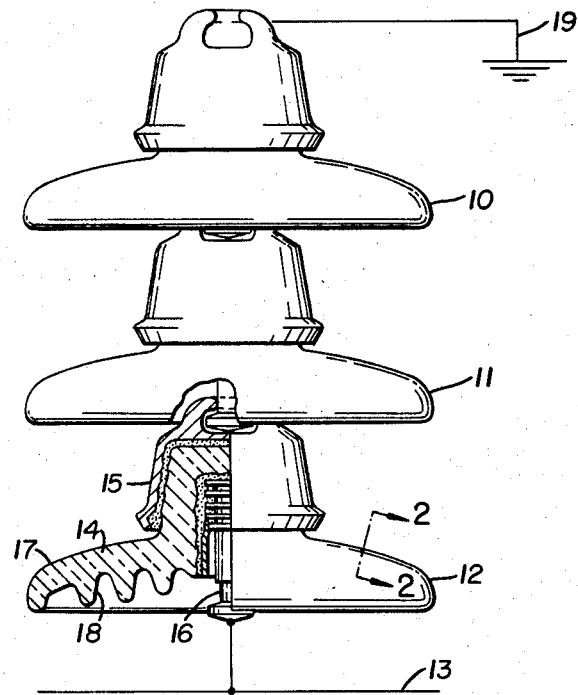
FIG. I
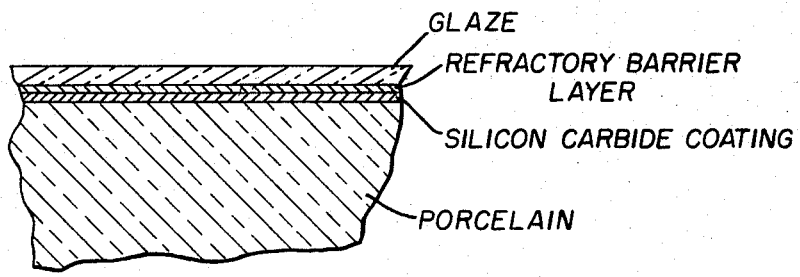
FIG. 2
INVENTOR.
WILLIAM J. SMOTHERS
BY
ATTORNEY

United States Patent Office 3,389,214
Patented June 18, 1968

3,389,214
COATED INSULATOR
William J. Smothers, Akron, Ohio, assignor to The Ohio Brass Company, Mansfield, Ohio, a corporation of New Jersey
Filed Aug. 20, 1963, Ser. No. 303,325
2 Claims. (Cl. 174—140)

This invention relates to an insulator with a multi-layer, non-linear, semi-conducting coating. The body of the insulator to which the coating is applied is of any non-conductive composition which will withstand the firing to which the coating is necessarily subjected.

The coating includes a surface glaze. Below this, and adjacent the insulator (but not necessarily touching it) is a semi-conducting layer which provides the desired conductivity. In addition, between the glaze and the semi-conducting layer is a barrier layer which prevents interaction between the semi-conducting layer and the glaze when the coating is fired. Some interaction may discolor the glaze, or it may cause the semi-conductor layer, if it contains silicon carbide, to boil during firing and produce a coating of uneven thickness.

Moisture and dirt collect on uncoated insulators forming a conducting coating the resistance of which varies greatly, depending upon the moisture present, and leakage current causes uneven evaporation of the moisture with consequent uneven increase in the resistance. Non-linear, semi-conducting surfaces are provided to maintain more uniform conditions. Glazes containing zinc dust or oxides of metals having different valences, namely oxides of iron, nickel, zinc, cobalt, chromium, copper and titanium have been used for this purpose.

A preferred semi-conducting coating contains upward of 30 or 40 or preferably 50 percent of silicon carbide, and it may contain as much as 80 percent. With other conducting materials, such as metal oxides it may contain as little as 10 percent of silicon carbide. If the coating is applied directly in contact with a flint-containing porcelain or other ceramic insulator, it advantageously contains 5 to 20 percent of flint, by weight, to improve the bond to the insulator. The coating is applied as an aqueous slurry, and preferably 10 percent of bentonite or other mineral suspending agent is added to keep the silicon carbide in suspension during the coating process. At least a part of the bentonite may be replaced by an organic thickening agent, such as a gum, etc. A flux is added, generally composed at least in part of feldspar. A preferred composition for the coating is:

| | Percent by weight |
|---|---|
| Silicon carbide [1] | 65 |
| Bentonite | 10 |
| Feldspar | 10 |
| Flint | 7.5 |
| M & D Ball Clay [2] | 7.5 |

[1] 400 to 120 mesh.
[2] A low-shrinkage bentonitic clay.

One hundred forty pounds of water is used for each 100 pounds of solids of the above formula. The silicon carbide is preferably added after the other solids have been ball milled in the water for 5 or 6 hours.

When the slurry is completed, it is applied to the insulator by dipping, flushing or other suitable means. The coating is eventually fired at 1150 to 1200° C. for 2 to 5 hours. Generally the ceramic insulator and all coatings are fired at the same time, any usual firing conditions being employed, as are known in the art. Oxides of metals having more than one valence such as titanium oxide, etc. may be added to this coating to increase the conductivity of the coating.

The semi-conducting coating should be about .004 to .010 inch thick after firing. It may be built up from two or more applications of a slurry. The preferred coating which is prepared from silicon carbide has a resistivity of approximately 10 megohms per square.

Semi-conducting coatings which have proven satisfactory in dry, sheltered places, increase in conductivity when wet and the conductivity is then too great. Dirt collected on the surface also affects the conductivity, particularly when wet. The current flows over the insulator surface through the coating. The resistance of the coating decreases when wet. Flow of current through the coating dries out the coating, and this decreases the flow of current. The coating minimizes the danger of flashover, but such variations in the properties of the coating are not desirable.

The outer layer of the coating of this invention is any ordinary glaze. The following formulae are illustrative. They are stated in terms of molecular equivalents as understood in the art:

EXAMPLE 1

$K_2O$, 0.09
$Na_2O$, .04
$CaO$, .48; $Al_2O_3$, 0.43; $SiO_2$, 4.12
$MgO$, .14, $Fe_2O_3$, .08
$ZnO$, .08
$MnO$, .17

EXAMPLE 2

$K_2O$, 0.09
$Na_2O$, .04; $Al_2O_3$, 0.68; $SiO_2$, 4.79
$CaO$, .55; $Fe_2O_3$, .08
$MgO$, .30; $Cr_2O_3$, .03
$NiO$, .02

EXAMPLE 3

$K_2O$, 0.10
$Na_2O$, .06; $Al_2O_3$, 0.54; $SiO_2$, 3.81
$CaO$, .60
$MgO$, .24

The surface of the glaze is smooth and it sheds both moisture and dirt. If applied directly over the semi-conducting coating, a reaction takes place on firing. Some reaction is necessary to form a bond but a violent reaction is to be avoided, and if a white or light-colored surface glaze is desired, a discoloring reaction is undesirable. With a silicon-carbide containing coating, a violent reaction occurs between the glaze and silicon carbide when fired, causing bubbles or blisters to form. This distorts the surface of the glaze. A more viscous and stiffer glaze lessens bubbling during firing but does not eliminate it.

To prevent a bubble-forming reaction to occur between the glaze and the silicon-carbide coating, and to prevent discoloration of a light-colored glaze on this or another semi-conducting coating, a refractory barrier layer (i.e. an inert non-metallic layer) is located between the two. This may be a ceramic slip such as may be used to form the insulator. The preferred barrier layer is composed of a ceramic composition prepared from

| | Percent by weight |
|---|---|
| Feldspar | 35 |
| Flint | 15 |
| Clay | 50 |

About equal parts of water and solids are used to make the slip. This may be applied over the coated insulator by dipping, spraying or other usual means. Usually, the barrier is not separately fired, but the insulator and oil coatings are fired at the same time. Any usual firing conditions can be used, such as, for example, 1150 to 1200° C. for 2 to 5 hours in an oxidizing or neutral atmosphere. The clay may be any clay known to the art. Any insulating ceramic composition can be used. It prevents the glaze from reacting with the silicon carbide or other conducting material in the semi-conducting layer during firing, and provides satisfactory bonding with the silicon-carbide or other semi-conducting layer without changing the conductivity of the semi-conducting layer. It also bonds to the glaze. This barrier layer, after firing, may, for example, be .002 to .008 inch thick.

Clays may be used alone, as the barrier layer, but they do not produce a good bond to the silicon carbide or other semi-conducting layer, and also to the glaze layer, unless impurities are present to serve as a flux. Too much impurity may cause bubbling, which is to be avoided. Alumina with a flux is quite satisfactory.

The glaze is formed over this. Any glaze known to the art may be used.

The successive layers may be applied by dipping, flushing, or any other suitable procedure. Each is usually dried before applying the next layer.

The multi-layer coating may, for example, be .008 to .02 inch thick. It may have an electrical resistance of, for example, 2 to 20 megohms per square. This depends upon such factors as the mesh size of the silicon carbide or other conductive particles, e.g. zinc dust, or an oxide of iron, nickel, titanium or the like in the semi-conducting layer, the thickness of the two coatings outside of the silicon carbide or other semi-conducting coating, whether the firing is in an oxidizing or neutral atmosphere, etc.

The application of the barrier and glaze coatings increases the conductivity of the semi-conducting coating. These two outer layers provide ionic-type conductivity in contrast to the electronic conductivity of the silicon carbide coating. The exponent of a ceramic insulator with a one-layer semi-conducting coating of the preferred composition which contains about 65 percent silicon carbide is about 3.9. When the barrier and glaze layers have been applied over this, and the product has been fired, the exponent drops to about 2.5 because a part of the conductivity of these latter layers is ionic. Typical coatings of the prior art have an exponent of not more than about 1.2. The danger of flash-over when wet decreases with increase in the exponent.

When most insulator coatings are heated their electrical resistance decreases. It is customary to refer to this phenomenon by the "one-half value temperature" of the coating, i.e. the amount (in degrees of temperature) that the temperature of the coating must be increased to decrease its resistance by one-half. The one-half value temperature of a typical conduction glaze on a ceramic insulator is 40 to 50° C.; that of the preferred multi-layer coating of the preferred composition described herein as typical is about 190° C. There is no marked change in the resistance of the coating at temperatures normally encountered.

When a ceramic insulator covered with the preferred multi-layer coating of this invention was subjected to the Electrolytic Corrosion Test (described in The Corrosion of Semi-conducting Glazes by E. J. D. Smith in Transactions of the British Ceramic Society, vol. 58, No. 5; May 1959, pages 277–300, the description of the test starting on page 280, and recording corrosion rates of 0.27 to 3800 micrograms per coulomb for different coatings) the corrosion rate was less than 0.01 microgram per coulomb.

The invention is illustrated in the accompany drawing, wherein FIGURE 1 is an elevation of connected suspension insulators, and FIGURE 2 is an enlarged section on the line 2—2 of FIGURE 1. A plurality of suspension insulators 10, 11 and 12 are connected in a series string to carry a line conductor 13. Each insulator comprises a porcelain body, a metal cap, and a metal pin, as shown for the body 14, cap 15, and pin 16 of the insulator 12. The cap and pin are formed as a ball and socket connector for mechanically and electrically interconnecting the insulators.

The semi-conducting coating of the present invention is applied to the top surface 17 and the under surface 18 of the insulator body. The coating is applied over both surfaces, and the silicon carbide layer of top surface 17 is conductively connected to the cap 15, and the silicon carbide or other semi-conducting layer of the under surface is conductively connected to the pin 16. Uniform contact or bonding with the semi-conducting layer about the circumference of the cap and pin is essential to insure uniform resistivity and current distribution in the circumferential direction of the insulator. Usually the coating is applied uniformly in the circumferential direction of the insulator, but uniformity in the radial direction, e.g. between the cap and the pin, is not required and non-uniformity in the radial direction is contemplated by the invention.

Because of the electrical interconnection afforded between the caps and pins of the several insulators, the coatings are electrically connected in series between the grounded tower, indicated schematically at 19, ond the conductor 13.

The resistivity of the coatings and the number of insulators is such that grading current of about one milliampere is provided along the string of insulators. With grading currents of this magnitude and voltage exponents of the magnitude provided by the silicon carbide coating, as heretofore described, substantially uniform division of line voltages is provided between the insulators.

One important result afforded by the invention relates to the grading provided in the vicinity of localized contaminants having high electrical conductivity on the surface of the insulators. Because of the strong grading action over the surface of the insulating body afforded by the silicon carbide layer, a surface current redistribution is accomplished in the vicinity of contaminants so that excessive heating and arc-over do not take place on the exposed surface of the insulator.

On firing, the clays change to the crystalline compound, mullite; feldspar changes to glass; silicon carbide and conductive metal oxides remain substantially unchanged.

The invention is covered in the claims which follow.

What I claim is:

1. An electric insulator comprising an insulating body and a fired ceramic coating on an exterior surface of the body comprising (1) a semi-conducting layer incorporating silicon carbide particles disposed over the surface of the body for distributing electric current over the insulator, (2) a surface glaze over the said silicon carbide layer, and (3) a ceramic barrier layer between said conducting layer and the glaze.

2. An insulator in accordance with claim 1 which is a suspension insulator, a cap on the top extremity of the insulating body and a pin on the under extremity of the body, with said fired ceramic coating on both extremities of the body, the silicon carbide content of said coating on the cap being uniform in a circumferential direction, and the silicon-carbide layer and the cap and pin being electroconductively connected to provide conductive current paths between said cap and pin uniformly about the insulator.

References Cited

UNITED STATES PATENTS

| | | | |
|---|---|---|---|
| 2,154,387 | 4/1939 | Sleeman | 117—70 X |
| 2,486,811 | 11/1949 | Weyl | 106—46 X |
| 2,752,258 | 6/1956 | Swentzel | 106—44 |
| 2,927,048 | 3/1960 | Pritikin | 117—70 X |

FOREIGN PATENTS

| | | |
|---|---|---|
| 532,117 | 1/1941 | Great Britain. |
| 34,011 | 10/1911 | Sweden. |

RALPH S. KENDALL, *Primary Examiner.*

ALFRED L. LEAVITT, *Examiner.*

J. R. BATTEN, Jr., *Assistant Examiner.*

Disclaimer 3,389,214.—*William J. Smothers*, Akron, Ohio. COATED INSULATOR. Patent dated June 18, 1968. Disclaimer filed Dec. 18, 1968, by the assignee, *The Ohio Brass Company*.

Hereby enters this disclaimer to all of the claims of said patent.

[*Official Gazette April 29, 1969.*]